United States Patent [19]
Shimasaki et al.

[11] Patent Number: 5,740,675
[45] Date of Patent: Apr. 21, 1998

[54] EXHAUST SYSTEM AMBIENT TEMPERATURE DETECTION SYSTEM FOR INTERNAL COMBUSTION ENGINE

[75] Inventors: Yuichi Shimasaki; Hiroshi Ohno; Tetsu Teshirogi; Hiroaki Kato; Akihisa Saito; Takashi Komatsuda; Hideo Furumoto; Takuya Aoki, all of Wako; Takayoshi Nakayama, Haga-machi, all of Japan

[73] Assignee: Honda Giken Kogyo Kabushiki Kaisha, Tokyo, Japan

[21] Appl. No.: 663,782

[22] Filed: Jun. 14, 1996

[30] Foreign Application Priority Data

Jun. 16, 1995 [JP] Japan .................... 7-174257

[51] Int. Cl.$^6$ .................... F02D 41/14; F01N 3/20; F01N 3/28

[52] U.S. Cl. .................... 60/274; 60/284; 60/300; 73/23.32; 123/697

[58] Field of Search .................... 60/274, 276, 284, 60/286, 300; 73/23.25, 23.31, 23.32; 123/697

[56] References Cited

U.S. PATENT DOCUMENTS

| | | | |
|---|---|---|---|
| 4,471,648 | 9/1984 | Uchida et al. | 123/697 |
| 4,708,777 | 11/1987 | Kuraoka | 123/697 |
| 5,218,946 | 6/1993 | Wild et al. | 123/697 |
| 5,285,762 | 2/1994 | Werner et al. | 123/697 |
| 5,357,752 | 10/1994 | Lucchesi | 123/697 |
| 5,600,947 | 2/1997 | Cullen | 60/300 |
| 5,655,364 | 8/1997 | Ma | 60/300 |

FOREIGN PATENT DOCUMENTS

| | | |
|---|---|---|
| 1-232246 | 9/1989 | Japan . |
| 2-024550 | 1/1990 | Japan . |
| 5-321645 | 12/1993 | Japan . |

*Primary Examiner*—Willis R. Wolfe
*Attorney, Agent, or Firm*—Nikaido, Marmelstein, Murray & Oram LLP

[57] ABSTRACT

A system for detecting the ambient temperature of an exhaust system of an internal combustion engine, where an oxygen sensor ($O_2$ sensor) is installed for detecting oxygen content in exhaust gases generated by the engine. The oxygen sensor has a detection element and a heater for heating the detection element when supplied with current. The exhaust system is further provided with a catalytic converter which similarly has a heater for heating the catalyst for promoting the activation thereof. The electric resistance of the sensor heater is detected and based on the detected resistance, the ambient temperature of the exhaust system is detected or estimated in accordance with characteristics preestablished with respect to the electric resistance of the heater. With the arrangement, it becomes possible to detect the ambient temperature of the exhaust system without using a temperature sensor. The detected ambient temperature is used for controlling the current supply to the heater of the catalytic converter.

21 Claims, 12 Drawing Sheets

EXHAUST SYSTEM AMBIENT TEMPERATURE DETECTION SYSTEM FOR INTERNAL COMBUSTION ENGINE

BACKGROUND OF THE INVENTION

1. Field of the Invention

This invention relates to a system for detecting an ambient temperature of the exhaust system of an internal combustion engine.

2. Description of the Related Art

An internal combustion engine usually has a three-way catalytic converter in the exhaust system which reduces all three types of CO, HC, and NOx emissions that escape through the exhaust system, and removes pollutants from the exhaust gases in the engine exhaust system. However, the catalyst is ineffective or inactive until its temperature has risen to a high temperature. It takes a long time until the catalytic converter has heated up to the necessary temperature from, for example, cold engine starting. For that reason, a catalytic converter having an electric heater that heats the catalyst to promote the activation is nowadays used.

Disadvantageously, the catalytic converter of this type requires a relatively large amount of electric energy. Moreover, when the catalytic converter is further heated up after it has been sufficiently activated, its service life is shortened and in addition, it wastes energy. It is therefore preferable to limit the time of current supply to the heater to the least. Because of this, Japanese Laid-Open Patent Application No. Hei 5 (1993)-321,645 proposes to install a temperature sensor in the engine exhaust system to monitor the exhaust system ambient temperature and based on the sensed temperature, to determine the time of current supply to the heater.

The prior art system has a drawback in that it requires a temperature sensor, rendering the configuration complicated and expensive.

Aside from the above, most internal combustion engines have an oxygen sensor or exhaust gas sensor (i.e., an $O_2$ sensor) installed upstream of the catalytic converter in the engine exhaust system. The oxygen sensor is often provided with an electric heater for heating the detection element comprised of a special coated ceramic core so as to enhance the detection ability. The current supply circuit for the heater includes a diagnosis circuit for monitoring the current supply to the heater to determine whether a failure has happened.

An object of the invention is therefore to provide a system and a method for detecting an ambient temperature of the exhaust system of an internal combustion engine which can solve the drawbacks in the prior art and which can detect the ambient temperature of the engine exhaust system, without using a temperature sensor, by utilizing the diagnosis current detection circuit of an oxygen sensor installed in the engine exhaust.

SUMMARY OF THE INVENTION

In order to achieve the object, the present invention provides a system for detecting ambient temperature of an exhaust system of an internal combustion engine, comprising: an oxygen sensor installed at the exhaust system for detecting oxygen content in exhaust gases generated by the engine, said oxygen sensor having a detection element for detecting the oxygen content in the exhaust gases and a heater for heating the detection element when supplied with current; an electric circuit for supplying current from a power source to the heater; electric resistance detecting means for detecting electric resistance of the heater when the heater is supplied with current; characteristic establishing means for establishing characteristics of the ambient temperature of the exhaust system with respect to the electric resistance of the heater; and exhaust system ambient temperature detecting means for detecting the ambient temperature of the exhaust system based on the detected electric resistance of the heater in accordance with the established characteristics.

BRIEF DESCRIPTION OF THE DRAWINGS

The above and other objects and advantages of the invention will be more apparent from the following description and drawings, in which.

3

DESCRIPTION OF THE PREFERRED EMBODIMENTS

Embodiments of the invention, given by way of example only, will now be explained with reference to the drawings.

Figure 1:
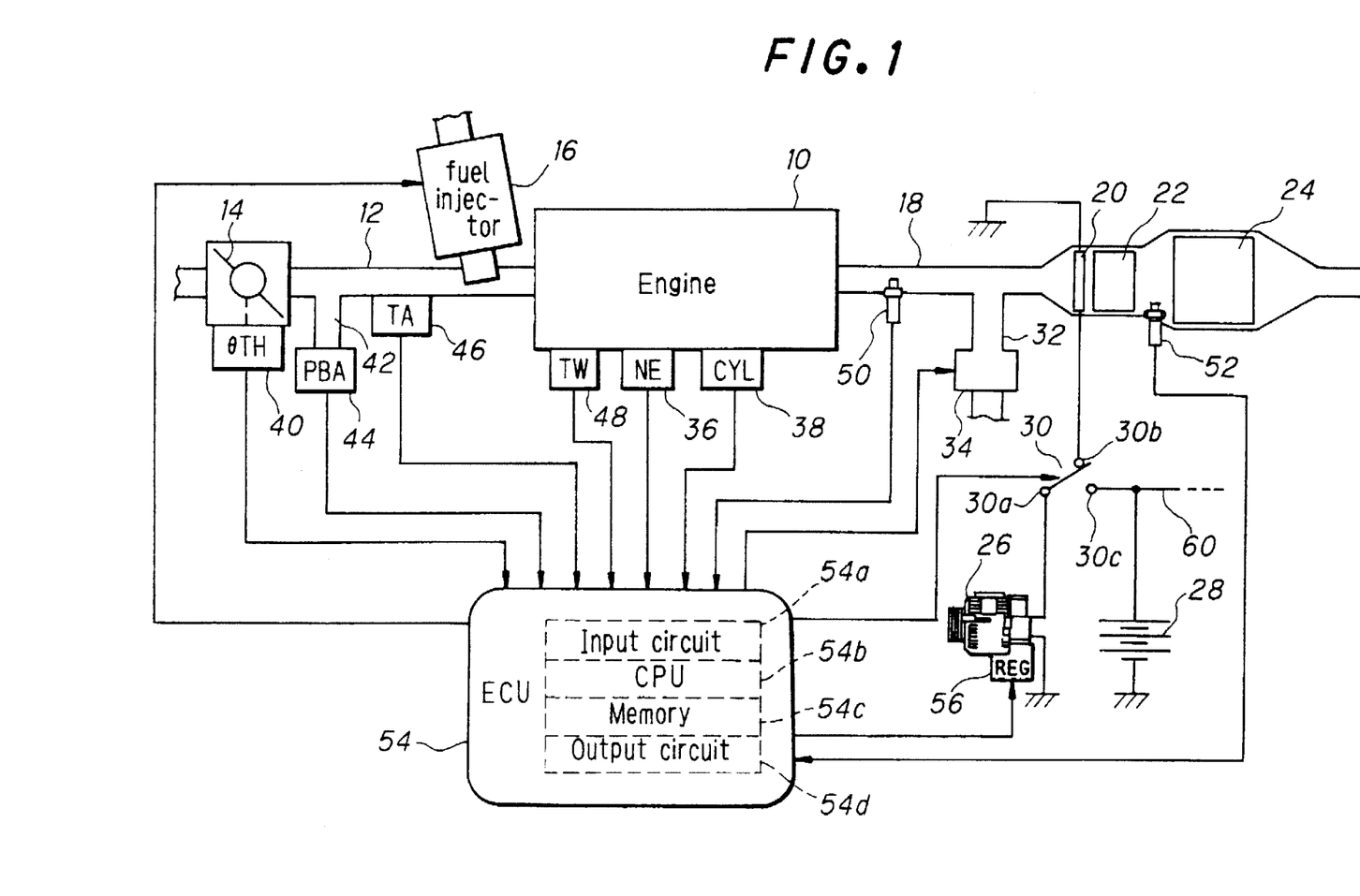
FIG. 1 is an overall schematic view showing a system for detecting an ambient temperature of an exhaust system of an internal combustion engine.

FIG. 1 is an overall schematic view showing a system for detecting an ambient temperature of an exhaust system of an internal combustion engine according to the invention.

Reference numeral 10 in this figure designates a multi-cylinder engine such as a four-cylinder internal combustion engine. Air drawn into an air intake pipe 12 through an air cleaner (not shown) mounted on a far end thereof is supplied to each of the first to fourth cylinders through a surge tank and an intake manifold (neither shown), while the flow thereof is adjusted by a throttle valve 14 provided in the air intake pipe 12. A fuel injector 16 for injecting fuel is installed in the vicinity of intake valves (not shown) of each cylinder of the engine. The injected fuel mixes with the intake air to form an air-fuel mixture that is ignited in the associated cylinder by a spark plug (not shown). The resulting combustion of the air-fuel mixture drives a piston (not shown) down.

The exhaust gas produced by the combustion is discharged through exhaust valves and an exhaust manifold (neither shown) to an exhaust pipe 18. The exhaust pipe 18 is installed with, from the upstream side, the aforesaid electrically heated catalytic converter (hereinafter referred to as "EHC") 20 having a heater (not expressly shown), a start catalytic converter 22 and a three-way catalytic converter 24, which burn off the remaining HC, CO, and NOx emissions in the exhaust gases escaped from the cylinders. The start catalytic converter 22 (known as a "light-off catalyst") is configured to have a relatively small diameter and volume and is provided in particular for enhancing catalyst conversion efficiency immediately after engine starting.

As illustrated in the figure, an alternator 26 is provided in the vicinity of the engine 10. The alternator 26 is connected to the crankshaft (not shown) of the engine 10 and is driven to produce electric energy. The generated electric energy is supplied to the EHC 20 and a battery 28. More specifically, a switch 30 is inserted in the current supply path. When terminals 30a and 30b are connected, the heater of the EHC 20 is connected with the alternator 26 to be supplied with current for heating. As a result, the heated EHC 20 burns off the remaining gases generated immediately after the engine starting. The EHC 20 further heats up with the heat generated by the chemical reaction of the burning and promptly reaches the activation temperature, thereby promoting the start catalytic converter 22 and the three-way catalytic converter 24 installed downstream thereof to activate.

The exhaust pipe 18 is connected with a conduit 32 which has an air pump 34 at the opposite end for supplying secondary air. Since a large amount of unburned gases are produced at engine starting, the air pump 34 is installed to supply air to the exhaust pipe 18 to promote burning, thereby enhancing conversion efficiency of the catalysts.

A crankshaft position sensor 36, illustrated as "NE" in the figure, is provided on the camshaft or crankshaft (neither shown) which produces a signal once per predetermined crank angular position. A camshaft position sensor 38, illustrated as "CYL" in the figure, is similarly provided on the camshaft (not shown) which produces a signal at a prescribed crank angular position of the first cylinder. A throttle position sensor 40, illustrated as "θTH" in the figure, is connected to the throttle valve 14 to detect, and to generate a signal indicative of, the degree of opening of the throttle valve 14. The air intake pipe 12 is branched off downstream of the position where the throttle valve 14 is placed, to have a branch 42. A manifold absolute pressure sensor 44, illustrated as "PBA" in the figure, is installed at the far end of the branch 42, to detect, and to generate a signal indicative of, the intake manifold pressure downstream of the throttle valve 14 in terms of absolute pressure.

In addition, the air intake pipe 12 is provided with an intake air temperature sensor 46, illustrated as "TA" in the figure, for detecting, and for generating a signal indicative of, the temperature of the intake air; and an engine coolant temperature sensor 48, illustrated as "TW" in the figure, for detecting, and for generating a signal indicative of, the temperature of the engine coolant.

On the other hand, the exhaust pipe 18 is provided with, upstream of the intersection where the conduit 32 is branched off, a first oxygen sensor 50 made of an $O_2$ sensor for detecting, and for generating a signal indicative of, the oxygen content in the exhaust gases. The exhaust pipe 18 is further provided with a second oxygen sensor 52 similarly made of an $O_2$ sensor, at a position between the start catalytic converter 22 and the three-way catalytic converter 24. The first and second $O_2$ sensors are respectively provided with a heater which heats up the detection element comprised of a special ceramic core, upon receipt of current from current supply circuits (neither shown). Since the structure and configuration of the $O_2$ sensors of this kind are known from prior art references such as Japanese Laid-Open Patent Application Nos. Hei 1(1989)-232,246 and Hei 2(1990)-24,550, no further explanation thereof will be made.

The signals outputted from the sensors are sent to a control unit 54 that is illustrated as "ECU" in the figure.

The ECU 54 comprises a microcomputer made up of an input circuit 54a, a CPU 54b, a memory 54c and an output circuit 54d. The input circuit 54a carries out various procedures including shaping some sensor signal waveforms, converting some sensor signals to predetermined levels in voltage, and converting some analog sensor signals into digital values. The memory 54c stores various data including calculation programs and the results of the calculations in response to the instructions made by the CPU 54b.

The CPU 54b operates, via the switch 30, to connect the alternator 26 to the EHC 20 to supply current thereto in response to the detected parameters. The alternator 26 has a regulator 56. The CPU 54b determines and outputs a pulse train indicative of a duty cycle in a pulse-width modulation control such that the alternator 26 produces electric power at a level determined by the duty cycle.

In the switch 30, on the other hand, when the terminal 30a is switched to connect with the terminal 30c, the alternator 26 is connected with the battery 28 to charge it. The battery 28 is connected, through a line 60, to various electric loads including a motor (not shown) of the air pump 34. The CPU 54b controls the operation of the air pump 34 by controlling the operation of the motor, and controls fuel metering through the fuel injector 16.

Figure 2:
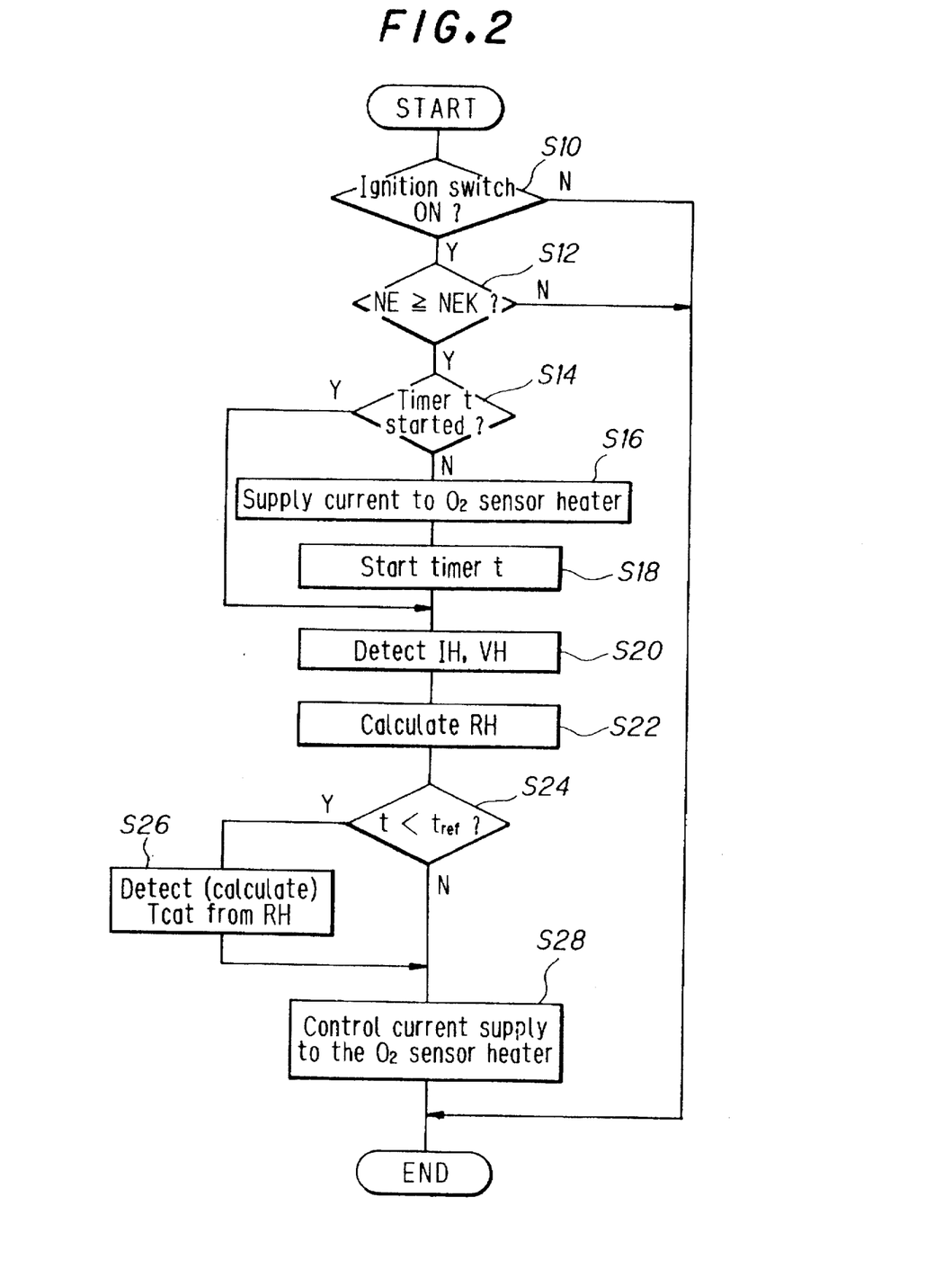
FIG. 2 is a flowchart showing the operation of the system illustrated in FIG. 1.

FIG. 2 is a flowchart showing the operation of the system according to the invention.

Before entering the explanation of the flowchart, however, since the system utilizes the electric resistance of one of the $O_2$ sensor heaters, specifically the heater of the second $O_2$ sensor 52 positioned closer to the EHC 20, to detect the ambient temperature of the exhaust system, the detection circuit will first be explained with reference to FIG. 3.

Figure 3:
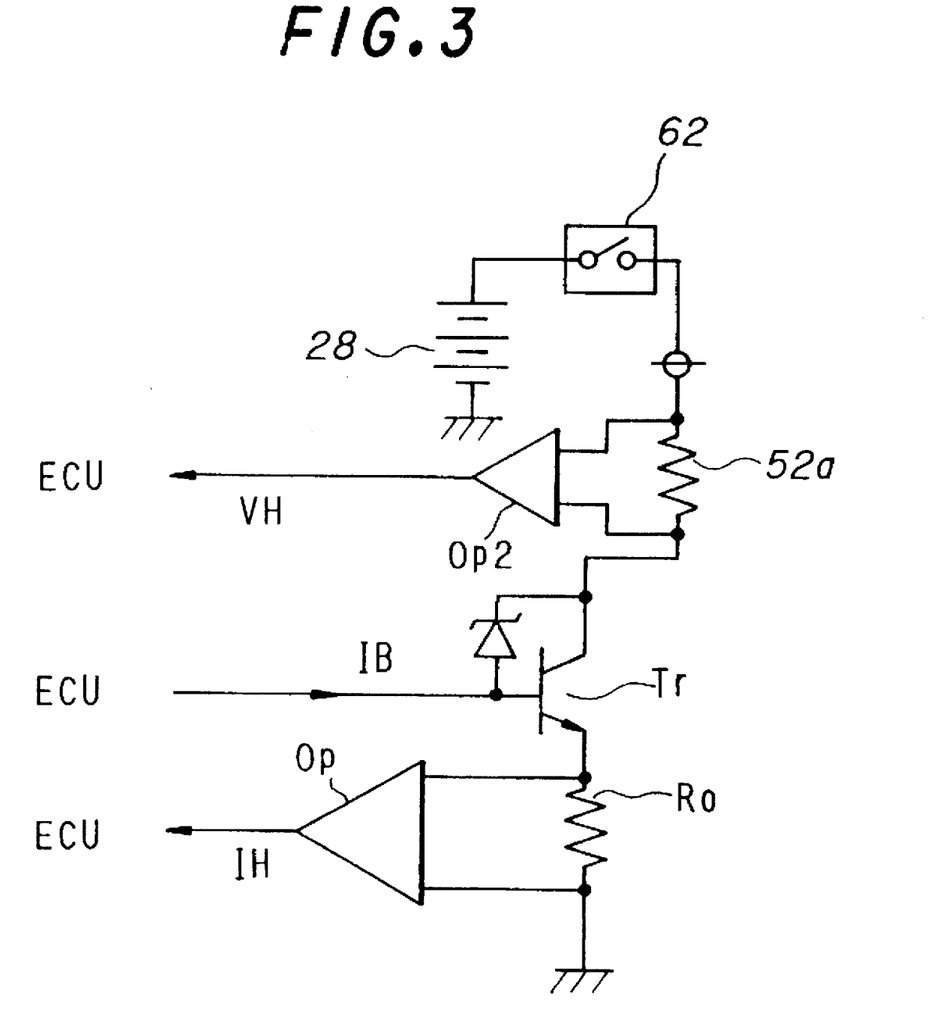
FIG. 3 is a circuit diagram showing the configuration of a circuit for detecting an electric resistance of a heater of an oxygen sensor, incorporated in a circuit supplying current to the heater, which is used in the system illustrated in FIG. 1.

FIG. 3 illustrates a circuit for supplying current to the heater 52a of the $O_2$ sensor 52, including that detecting the electric resistance of the heater. As illustrated, the $O_2$ sensor heater 52a is connected to the battery 28. To be more specific, the ECU 54 supplies a pulse train indicative of a duty cycle in the pulse-width modulation to the base of a power transistor Tr when an ignition switch 62 (not shown in FIG. 1) is turned ON such that the current supply to the heater 52a is controlled in response to the duty cycle. A resistor (shunt resistor) Ro is inserted between the emitter of the transistor Tr and ground. The voltage drop across the resistor Ro is monitored and forwarded to the ECU 54 through an operational amplifier Op to detect heater current IH.

In the above, when naming the heater resistance as RH, it is defined as:

$$RH=VH/(IH-IB)$$

Here, VH: voltage applied to the heater; IH: current passing through the heater; IB: base current of the transistor Tr.

Since, however, IH>>IB, the heater resistance RH may be approximated as:

$$RH=VH/IH$$

Therefore, by detecting the voltage applied to the heater VH through a second operational amplifier Op2, it becomes possible to detect the heater's electric resistance RH.

Figure 4:
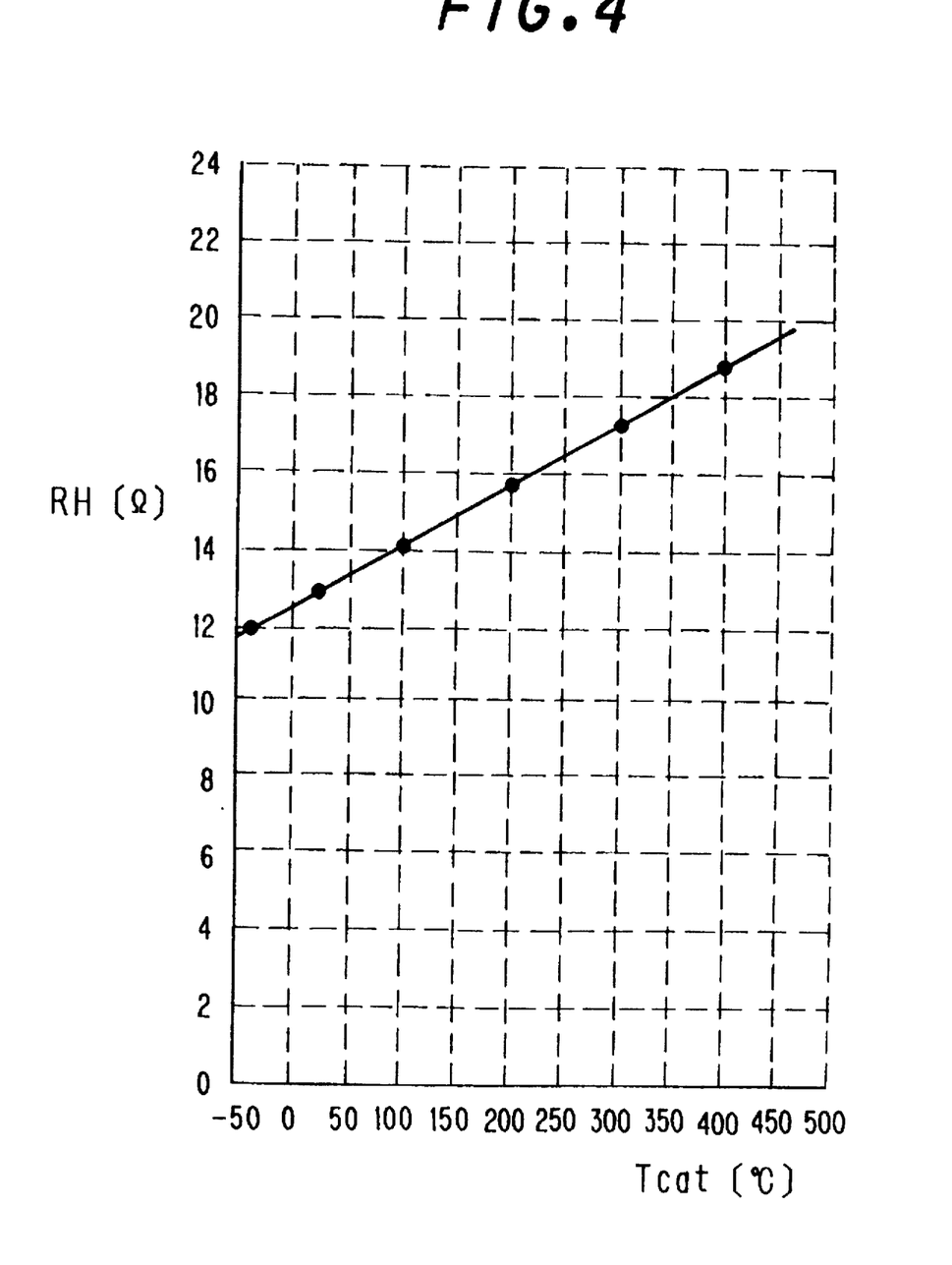
FIG. 4 is a graph showing the characteristics of the exhaust system ambient temperature with respect to the heater resistance.

Assuming that it is within a very short period or time since the commencement of the current supply in which the heater 52a has not been sufficiently heated up such that the heater is at the temperature corresponding to the exhaust system ambient temperature, the exhaust system ambient temperature Tcat is considered to be proportional to the heater resistance RH, as shown in FIG. 4. This means that, by obtaining the characteristics of the exhaust system ambient temperature with respect to the heater resistance in advance through experimentation and then by detecting the heater resistance, it becomes possible to detect or estimate the exhaust system ambient temperature. The invention is based on the above understanding.

Returning to the flowchart of FIG. 2, the operation of the system will be explained. The program disclosed in the flowchart is looped or activated at regular intervals.

The program begins at S10 in which it is checked whether an ignition switch is turned ON, more specifically it is being turned ON, in other words, it is checked whether the engine is being starting and when the result is affirmative, the program proceeds to S12 in which it is checked if the engine speed NE has reached a reference engine speed NEK, such as 400 rpm, indicating that the engine runs by itself, without the aid of a cranking motor.

When the result in S12 is affirmative, the program goes to S14 in which it is checked whether a timer t (explained later) has started to measure time. The result will naturally be negative in the first program loop and the program proceeds to S16 in which the current supply to the heater 52a of the $O_2$ sensor 52 is commenced. The program next goes to S18 in which the aforesaid timer t is started to begin time measurement. Thus, the timer t is provided for measuring the time lapse from the commencement of the current supply to the $O_2$ sensor heater 52a.

The program then proceeds to S20 in which the current IH passing through the heater and the voltage VH applied to the heater are detected, and to S22 in which the heater resistance RH is calculated. The program then goes to S24 in which it is checked whether the value of the timer t is less than a predetermined time tref and if it is, the program proceeds to S26 in which the exhaust system ambient temperature Tcat is detected (or calculated) from the calculated heater resistance RH in accordance with the characteristics (shown in FIG. 4) prepared beforehand through experimentation as was explained above.

On the other hand, when S24 finds that the timer value t exceeds the predetermined time tref, the program moves to S28 in which the current supply to the $O_2$ sensor heater 52a, initiated at S16, is continued to further heat up the heater for a prescribed time until the calculated heater resistance RH exceeds a predetermined range or the engine coolant temperature TW has risen to a prescribed value.

When the result in S10 or S12 is negative, moreover, the program is immediately terminated. In addition, when S14 finds in the next or succeeding loops that the timer t was started, the program jumps to S20 and on, and each time the timer value t is found to be less than the predetermined time tref in S24, the exhaust system ambient temperature Tcat is calculated in S26.

The reason why the exhaust system ambient temperature Tcat is detected only when the timer value t is found in S24 to be less than the predetermined time tref, is, needless to say, that when the current has been continually supplied to the heater for the predetermined time, and the heater resistance will be a value determined solely by the materials constituting the heater, which is different from the exhaust system ambient temperature. In that sense, the predetermined time tref should be a marginal time or period during which the heater has not been heated up such that the relationship or characteristics (illustrated in FIG. 4) between the heater resistance RH and the exhaust system ambient temperature Tcat continues to exist.

Based on the exhaust system ambient temperature Tcat thus detected, the current supply control to the EHC is carried out. This will then be explained with reference to a flowchart shown in FIG. 5.

Figure 5:
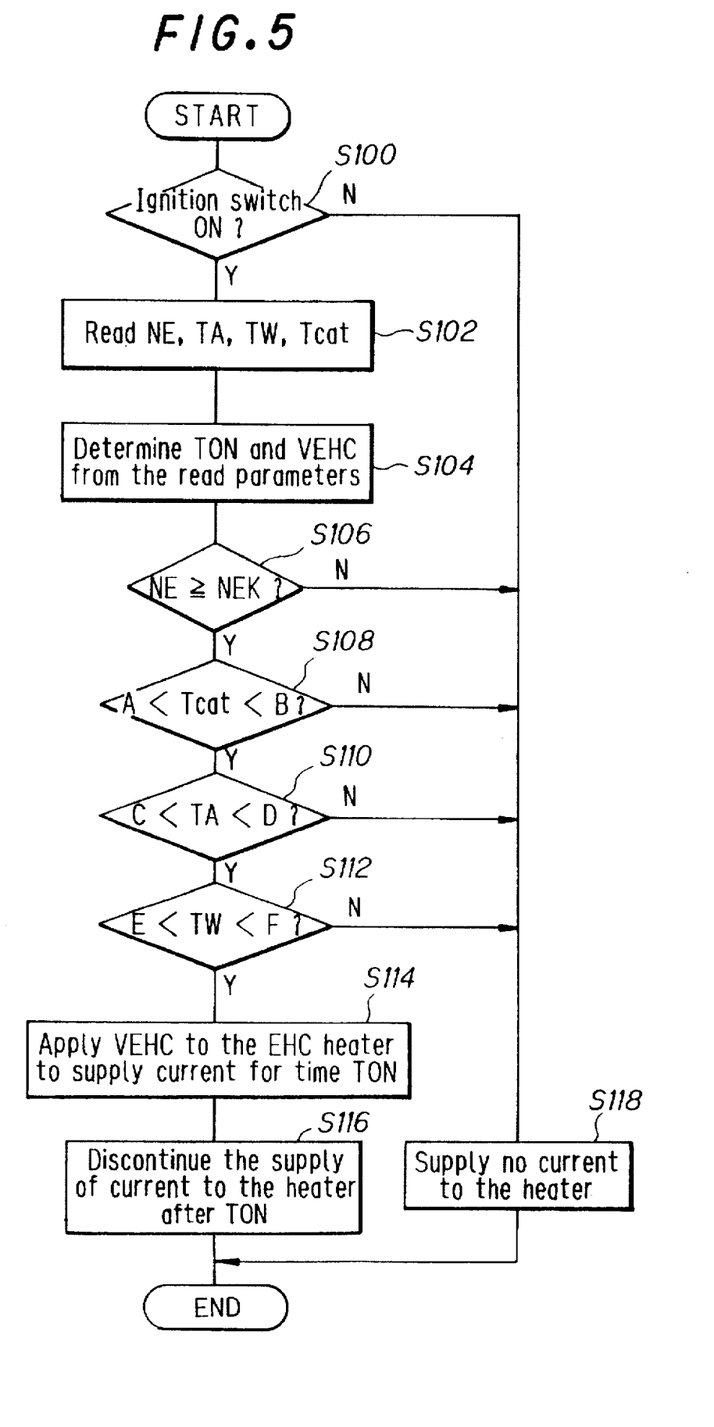
FIG. 5 is a flowchart showing the current supply control to the catalytic converter heater to be carried out based on the detected exhaust system ambient temperature.

First, in S100, it is again checked whether the ignition switch 72 is turned ON, more specifically it is being turned ON and when the result is affirmative, the program proceeds to S102 in which various engine operating parameters including the engine speed NE, the intake air temperature TA, the engine coolant temperature TW, and the detected exhaust system ambient temperature Tcat are read. The program then goes to S104 in which the time TON during which the current is to be supplied to the EHC 20 and the voltage VEHC to be applied to the EHC 20 are determined. The voltage VEHC is determined to be, for example, 30 V at cold engine starting.

Figure 6:
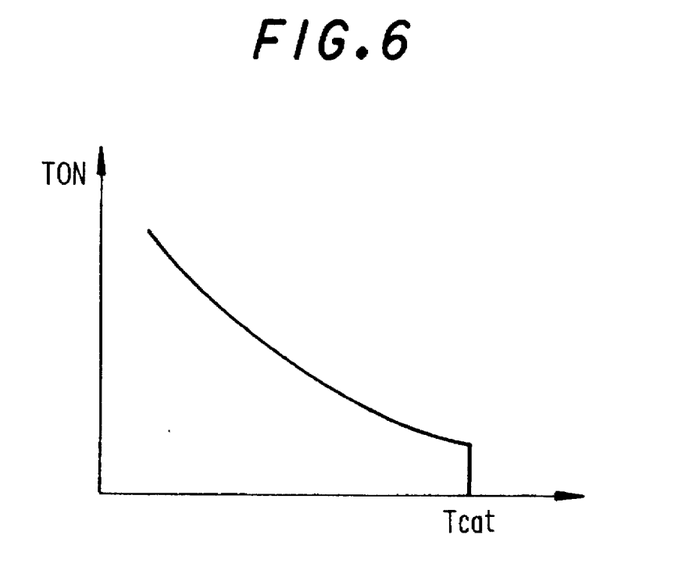
FIG. 6 is a graph showing the characteristics of the time during which current is to be supplied to the catalytic converter heater, determined with respect to the exhaust system ambient temperature referred to in the control shown in FIG. 5.
Figure 7:
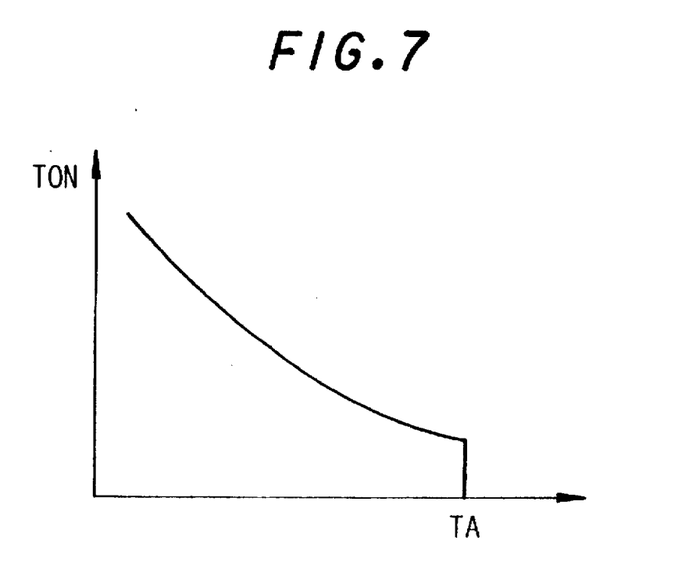
FIG. 7 is a graph showing the characteristics of the time during which current is to be supplied to the catalytic converter heater, determined with respect to the intake air temperature referred to in the control shown in FIG. 5.
Figure 8:
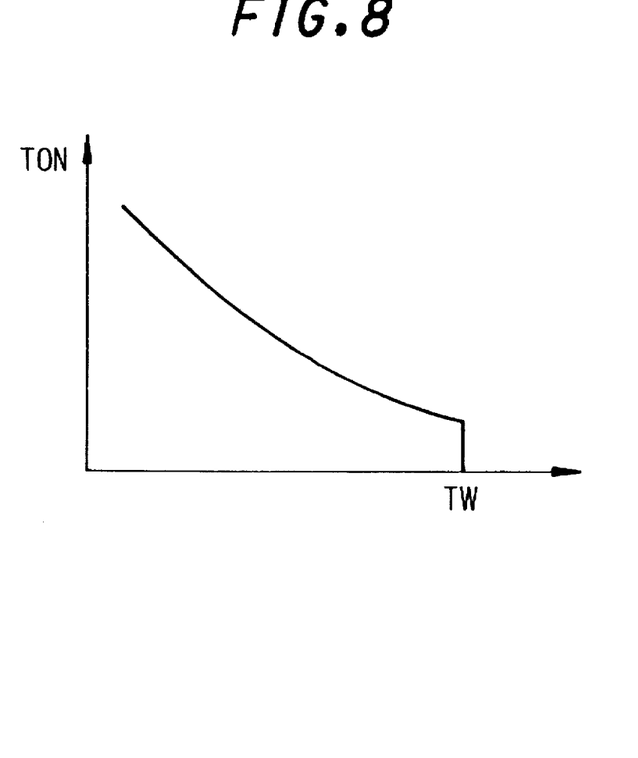
FIG. 8 is a graph showing the characteristics of the time during which current is to be supplied to the catalytic converter heater, determined with respect to the engine coolant temperature referred to in the control shown in FIG. 5.
Figure 9:
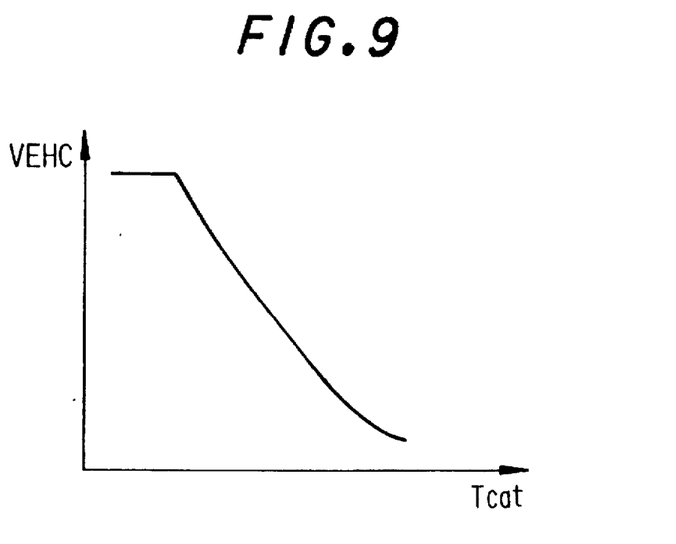
FIG. 9 is a graph showing the characteristics of the voltage to be applied to the catalytic converter heater, determined with respect to the exhaust system ambient temperature referred to in the control shown in FIG. 5.
Figure 10:
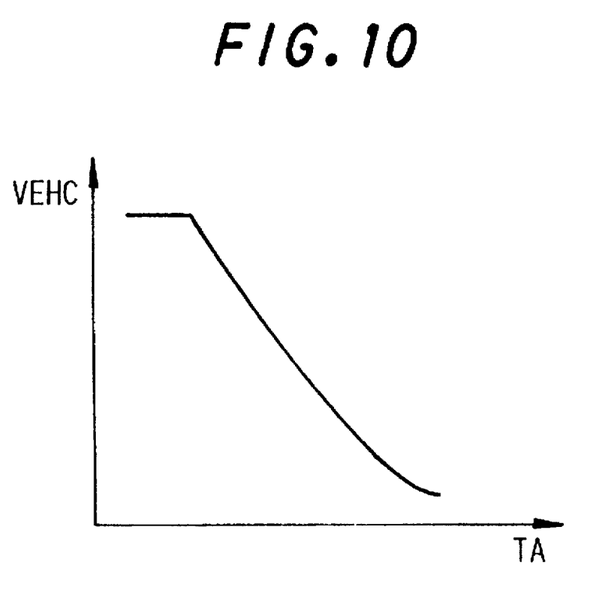
FIG. 10 is a graph showing the characteristics of the voltage to be applied to the catalytic converter heater, determined with respect to the intake air temperature referred to in the control shown in FIG. 5.
Figure 11:
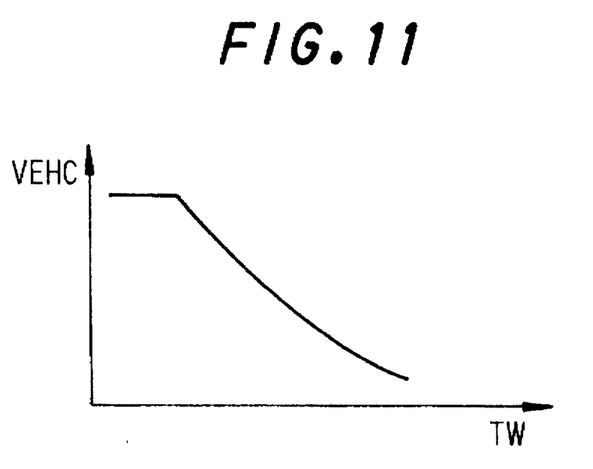
FIG. 11 is a graph showing the characteristics of the voltage to be applied to the catalytic converter heater, determined with respect to the engine coolant temperature referred to in the control shown in FIG. 5.

It should be noted here that the current supply time TON is determined, as illustrated in FIGS. 6 to 8, such that it decreases with increasing exhaust system ambient temperature Tcat, with increasing intake air temperature TA, or with increasing engine coolant temperature TW. Similarly, as illustrated in FIGS. 9 to 11, the voltage VEHC is also determined to be less as these temperatures rise.

The program then proceeds to S106 in which it is again checked whether the engine speed NE has reached the aforesaid engine speed NEK. If the result is affirmative, the program goes to S108 and to S112 via S110 in which it is respectively determined whether the exhaust system ambient temperature Tcat, the intake air temperature TA and the engine coolant temperature TW are within a range defined between values A and B, C and D or E and F, respectively.

When the results in these steps are all affirmative, the program proceeds to S114 in which the alternator 26 is switched to be connected with the EHC 20 (via terminals 30a, 30b) and the alternator 26 is controlled, through the regulator 56, to generate the determined voltage VEHC and apply the voltage to the heater of the EHC 20 to produce the current that passes through the EHC heater. The program then advances to S116 in which the time is measured and when it has reached the time TON, the terminal 30a is switched to connect with the other terminal 30c to open the circuit and discontinue the current supply to the EHC heater.

In the above, when the result in any of S100 and S106 to S112 is negative, the program goes to S118 in which the current supply to the EHC heater is not performed. Although not shown in the flowchart, the air pump 34 is controlled to provide secondary air in the exhaust pipe 18 simultaneously with the current supply to the EHC heater.

Since the embodiment is arranged such that exhaust system ambient temperature is detected or estimated, without using a temperature sensor, from the electric resistance of the $O_2$ sensor 52a within an initial stage of the current supply thereto, the system configuration is made simple to lower the cost for manufacturing. Moreover, since a temperature sensor is not necessary, space in the exhaust system is not decreased. In addition, the reliability of the system is improved due to the fact that the number of system components is not increased.

Furthermore, since the current supply control to the EHC is carried out based on the detected or estimated exhaust system ambient temperature, it becomes possible to supply current to heat up the EHC as early as possible at, for example, a cold engine starting, thereby enhancing conversion efficiency of the catalysts. On the other hand, since the current supply to the EHC is not carried out when the catalysts still remain effective in a situation, for example, where the engine was once stopped, but re-started after a short period, the catalysts are prevented from becoming degraded, which would otherwise occur.

Figure 12:
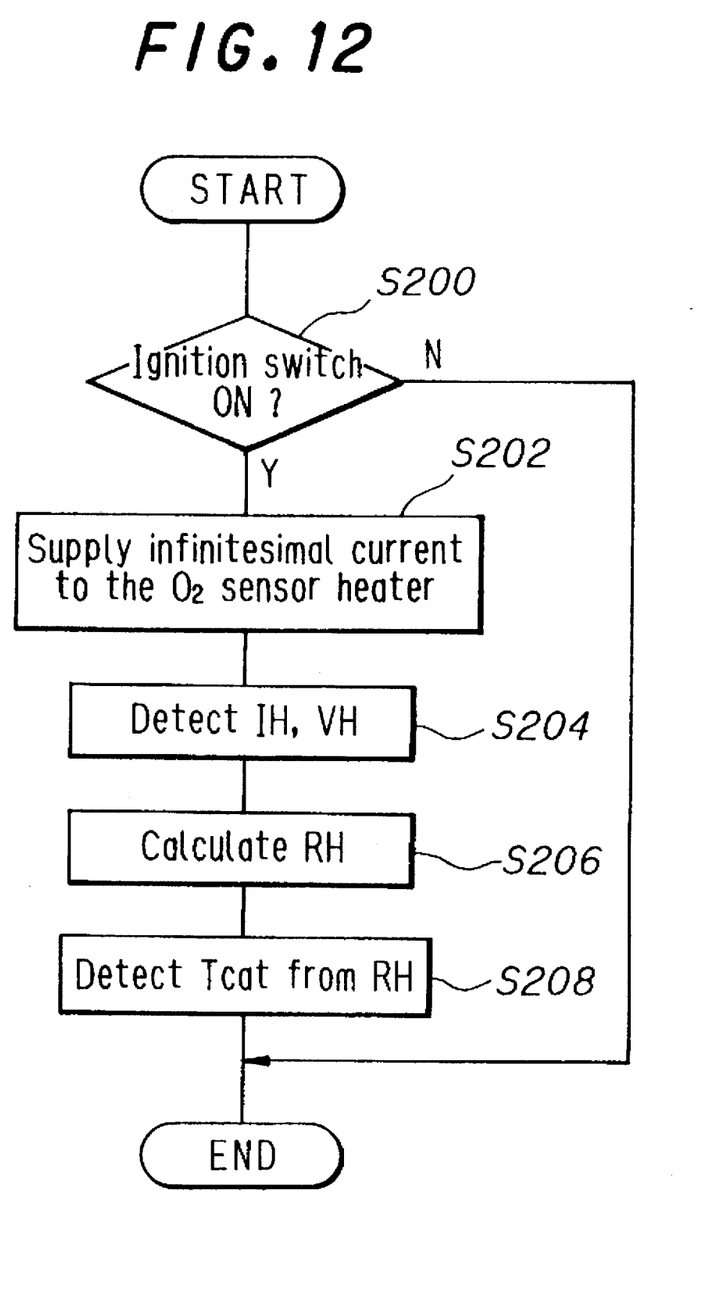
FIG. 12 is a flowchart, similar to FIG. 2, but showing the operation of the system according to a second embodiment of the invention.
Figure 13:
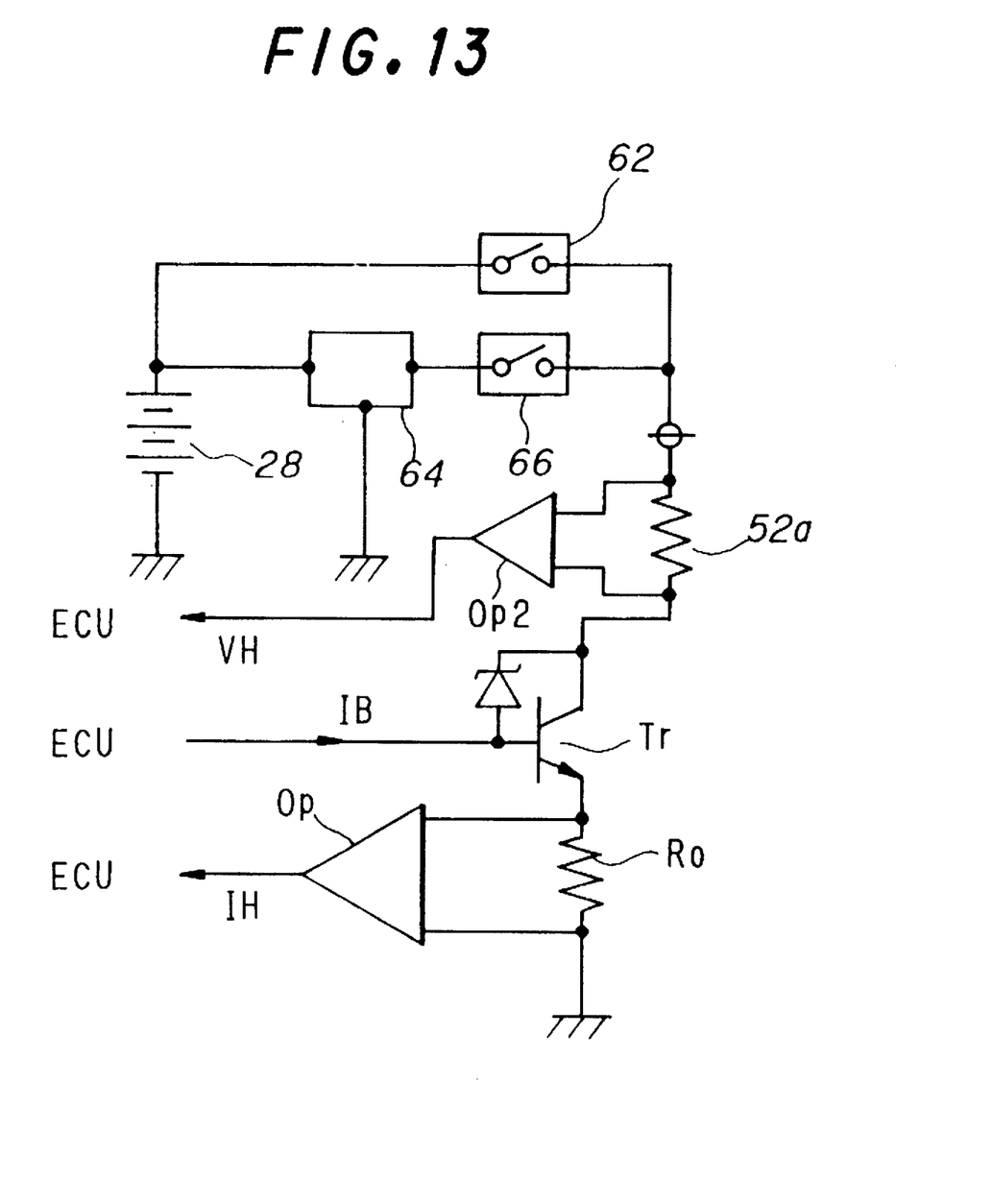
FIG. 13 is a circuit diagram, similar to FIG. 3, but showing the configuration of the heater resistance detection circuit used in the system according to the second embodiment of the invention.

FIG. 12 is a flowchart, similar to FIG. 2, but showing the operation of the system according to a second embodiment of the invention. FIG. 13 is a circuit diagram illustrating a detection circuit used in the second embodiment.

Explaining the second embodiment referring first to FIG. 13, the system is provided with a stabilized power supply device 64 such as a three terminal regulator and a switch 66 in such a manner that infinitesimal current is supplied to the $O_2$ sensor heater 52a from the battery 28 through the regulator 64 when the switch 66 is turned ON. To be more specific, in the first embodiment, current is sufficiently supplied to the $O_2$ sensor for heating up so as to bring it into operation. In the second embodiment, on the contrary, infinitesimal current insufficient for making the sensor activate is supplied to the sensor heater for detecting the exhaust system ambient temperature. The rest of the circuit components illustrated in FIG. 13 is the same as those shown in the first embodiment.

Explaining the operation of the system with reference to FIG. 12, the program begins at S200 in which it is checked whether the ignition switch 62 is being turned ON and if it is, the program proceeds to S202 in which the $O_2$ sensor heater is supplied with the infinitesimal current for detection, to S204, S206 and S208 in which the exhaust system ambient temperature Tcat is finally detected in the same manner as that in the first embodiment.

Having been configured in the foregoing manner, the system in the second embodiment is less simple, when compared with the system in the first embodiment, but it can detect the exhaust system ambient temperature more correctly, since the sensor heater is not heated up for activation.

It should be noted that, although the infinitesimal current is supplied from the battery 28 through the three terminal regulator 64, it is alternatively possible to provide a power source separately from the battery 28.

Figure 14:
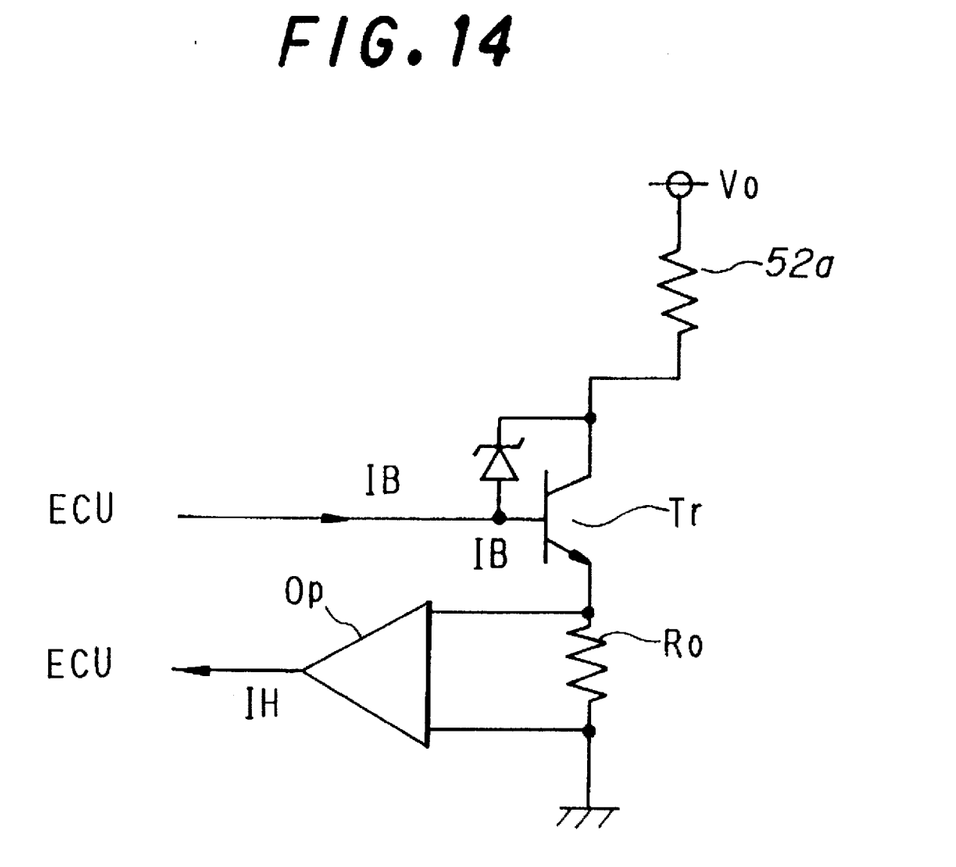
FIG. 14 is a circuit diagram, similar to FIG. 13, but showing the configuration of the heater resistance detection circuit in the system according to a third embodiment of the invention.

FIG. 14 is a circuit diagram, similar to FIG. 13, but showing a detection circuit of the system according to a third embodiment of the invention.

In the third embodiment, the heater resistance RH is detected or calculated solely from current values. Specifically, the heater current in the circuit can be obtained as:

$$IH=\{Vo/(RH+Ro)\}+IB$$

The heater resistance RH can therefore be obtained as follows:

$$RH=\{Vo/(IH-IB)\}-Ro$$

Here, Vo: voltage applied to the circuit; and Ro: a shunt resistance.

In the above, assuming Vo, Ro and IB are constant, the heater resistance RH can be obtained solely from the current values. The sensor heater resistance can also be calculated using either manner explained in the first or second embodiments.

The third embodiment can further make the system configuration simpler.

Figure 15:
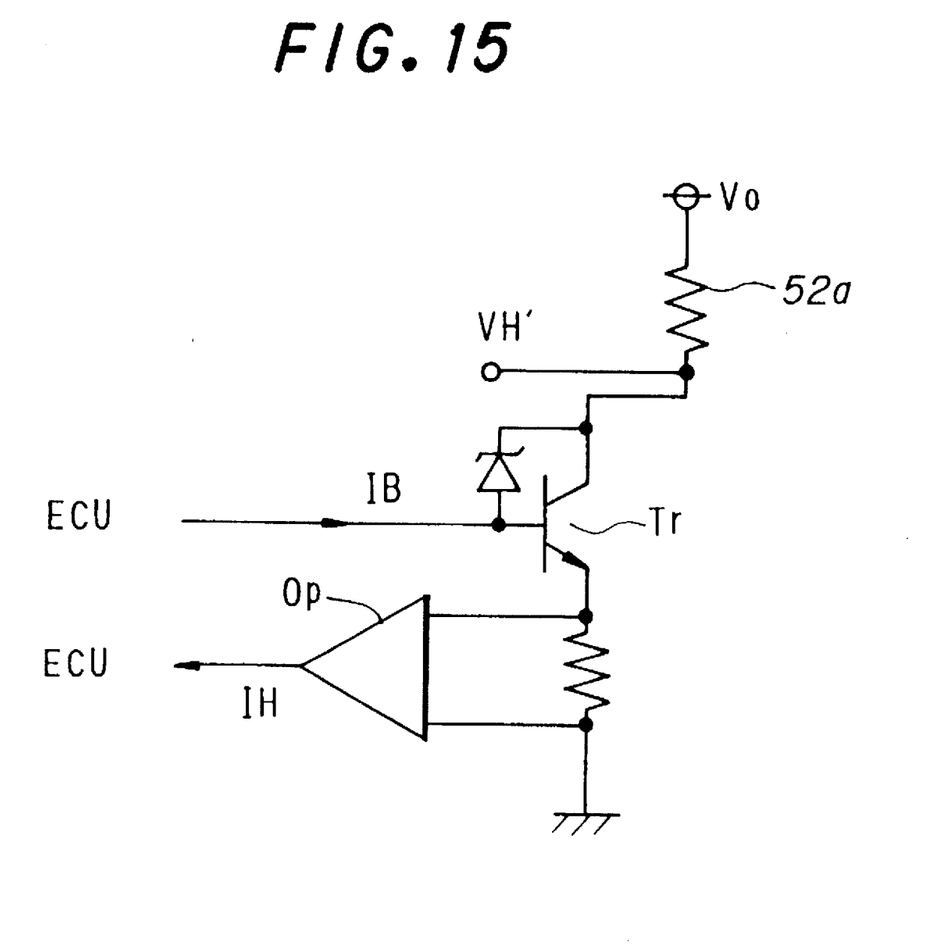
FIG. 15 is a circuit diagram, similar to FIG. 13, but showing the configuration of the heater resistance detection circuit in the system according to a fourth embodiment.

FIG. 15 is a view, similar to FIG. 14, but showing a detection circuit of the system according to a fourth embodiment of the invention.

In the circuit, assuming that the voltage Vo applied to the circuit is constant, the voltage VH applied to the heater is:

$$VH=Vo-VH'$$

Here, VH': the voltage downstream of the heater. The heater resistance RH is therefore calculated as:

$$RH=(Vo-VH')/(IH-IB)$$

In the circuit, since IH>>IB, the heater resistance can be calculated as:

$$RH=(Vo-VH')/IH$$

The heater resistance is thus calculated in the fourth embodiment by the voltage VH' downstream of the heater and the current value IH. In the fourth embodiment, the sensor heater can also be calculated using either manner explained in the first or second embodiments.

The fourth embodiment has similar advantages to those of the foregoing embodiments.

It should be noted in the foregoing that, although the exhaust system ambient temperature is detected by detecting the electric resistance of the heater of the second $O_2$ sensor installed at the downstream side, it is alternatively possible to detect the temperature by detecting that of the first $O_2$ sensor.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for detecting ambient temperature of an exhaust system of an internal combustion engine, comprising:

an oxygen sensor installed at the exhaust system for detecting oxygen content in exhaust gases generated by the engine, said oxygen sensor having a detection element for detecting the oxygen content in the exhaust gases and a heater for heating the detection element when supplied with current;

an electric circuit for supplying current from a power source to the heater;

electric resistance detecting means for detecting electric resistance of the heater when the heater is supplied with current;

characteristic establishing means for establishing characteristics of the ambient temperature of the exhaust system with respect to the electric resistance of the heater; and exhaust system ambient temperature detecting means for detecting the ambient temperature of the exhaust system based on the detected electric resistance of the heater in accordance with the established characteristics.

2. A system according to claim 1, wherein said electric resistance detecting means detects the electric resistance of the heater when the heater is supplied with current for a predetermined period for heating up the heater.

3. A system according to claim 2, wherein said electric resistance detecting means includes:

voltage detecting means for detecting a voltage VH applied to the heater;

current detecting means for detecting a current IH passing through the heater; and electric resistance calculating means for calculating the electric resistance RH of the heater by dividing the voltage by the current as:

$RH=VH/IH.$

4. A system according to claim 1, further including:

a catalytic converter installed in the exhaust system of the engine, said catalytic converter having a heater for heating up a catalyst in the catalytic converter;

an electric circuit for connecting the heater of the catalytic converter with the power source, when closed; and switching means for closing the electric circuit for supplying current from the power source to the heater of the catalytic converter based on the detected ambient temperature of the exhaust system.

5. A system according to claim 1, wherein said electric resistance detecting means detects the electric resistance of the heater when the heater is supplied with infinitesimal current for detection.

6. A system according to claim 5, wherein said electric resistance detecting means includes:

voltage detecting means for detecting a voltage VH applied to the heater;

current detecting means for detecting a current IH passing through the heater; and electric resistance calculating means for calculating the electric resistance RH of the heater by dividing the voltage by the current as:

$RH=VH/IH.$

7. A system according to claim 5, further including:

a catalytic converter installed in the exhaust system of the engine, said catalytic converter having a heater for heating up a catalyst in the catalytic converter;

an electric circuit for connecting the heater of the catalytic converter with the power source, when closed; and switching means for closing the electric circuit for supplying current from the power source to the heater of the catalytic converter based on the detected ambient temperature of the exhaust system.

8. A method for detecting ambient temperature of an exhaust system of an internal combustion engine, including:

an oxygen sensor installed at the exhaust system for detecting oxygen content in exhaust gases generated by the engine, said oxygen sensor having a detection element for detecting the oxygen content in the exhaust gases and a heater for heating the detection element when supplied with current; and an electric circuit for supplying current from a power source to the heater;

wherein said method comprises the steps of:

detecting electric resistance of the heater when the heater is supplied with current;

establishing characteristics of the ambient temperature of the exhaust system with respect to the electric resistance of the heater; and detecting the ambient temperature of the exhaust system based on the detected electric resistance of the heater in accordance with the established characteristics.

9. A method according to claim 8, wherein the electric resistance of the heater is detected by supplying current to the heater for a predetermined period for heating up the heater.

10. A method according to claim 9, wherein said step of detecting the electric resistance of the heater includes the steps of:

detecting a voltage VH applied to the heater;

detecting a current IH passing through the heater; and calculating the electric resistance RH of the heater by dividing the voltage by the current as:

$RH=VH/IH.$

11. A method according to claim 8, further including:

a catalytic converter installed in the exhaust system of the engine, said catalytic converter having a heater for heating up a catalyst in the catalytic converter; and an electric circuit for connecting the heater of the catalytic converter with the power source, when closed;

and said method includes the step of:

closing the electric circuit for supplying current from the power source to the heater of the catalytic converter based on the detected ambient temperature of the exhaust system.

12. A method according to claim 8, wherein said electric resistance of the heater is detected by supplying infinitesimal current to the heater for detection.

13. A method according to claim 12, wherein said step of detecting the electric resistance of the heater includes the steps of:

detecting a voltage VH applied to the heater;

detecting a current IH passing through the heater; and calculating the electric resistance RH of the heater by dividing the voltage by the current as:

$$RH=VH/IH.$$

14. A method according to claim 12, further including:
a catalytic converter installed in the exhaust system of the engine, said catalytic converter having a heater for heating up a catalyst in the catalytic converter; and
an electric circuit for connecting the heater of the catalytic converter with the power source, when closed;
and further including the step of:
closing the electric circuit for supplying current from the power source to the heater of the catalytic converter based on the detected ambient temperature of the exhaust system.

15. A computer program for detecting ambient temperature of an exhaust system of an internal combustion engine, including:
an oxygen sensor installed at the exhaust system for detecting oxygen content in exhaust gases generated by the engine, said oxygen sensor having a detection element for detecting the oxygen content in the exhaust gases and a heater for heating the detection element when supplied with current; and
an electric circuit for supplying current from a power source to the heater;
wherein said computer program comprises the steps of:
detecting electric resistance of the heater when the heater is supplied with current;
establishing characteristics of the ambient temperature of the exhaust system with respect to the electric resistance of the heater; and
detecting the ambient temperature of the exhaust system based on the detected electric resistance of the heater in accordance with the established characteristics.

16. A computer program according to claim 15, wherein the electric resistance of the heater is detected by supplying current to the heater for a predetermined period for heating up the heater.

17. A computer program according to claim 16, wherein said step of detecting the electric resistance of the heater includes the steps of:
detecting a voltage VH applied to the heater;
detecting a current IH passing through the heater; and
calculating the electric resistance RH of the heater by dividing the voltage by the current as:

$$RH=VH/IH.$$

18. A computer program according to claim 15, further including:
a catalytic converter installed in the exhaust system of the engine, said catalytic converter having a heater for heating up a catalyst in the catalytic converter; and
an electric circuit for connecting the heater of the catalytic converter with the power source, when closed;
and said method includes the step of:
closing the electric circuit for supplying current from the power source to the heater of the catalytic converter based on the detected ambient temperature of the exhaust system.

19. A computer program according to claim 15, wherein said electric resistance of the heater is detected by supplying infinitesimal current to the heater for detection.

20. A computer program according to claim 19, wherein said step of detecting the electric resistance of the heater includes the steps of:
detecting a voltage VH applied to the heater;
detecting a current IH passing through the heater; and
calculating the electric resistance RH of the heater by dividing the voltage by the current as:

$$RH=VH/IH.$$

21. A computer program according to claim 19, further including:
a catalytic converter installed in the exhaust system of the engine, said catalytic converter having a heater for heating up a catalyst in the catalytic converter; and
an electric circuit for connecting the heater of the catalytic converter with the power source, when closed;
and further including the step of:
closing the electric circuit for supplying current from the power source to the heater of the catalytic converter based on the detected ambient temperature of the exhaust system.

* * * * *